US010454116B2

(12) United States Patent
Ali et al.

(10) Patent No.: US 10,454,116 B2
(45) Date of Patent: Oct. 22, 2019

(54) THIN BATTERY AND MANUFACTURING METHOD THEREFORE

(71) Applicant: Saralon GmbH, Chemnitz (DE)

(72) Inventors: Moazzam Ali, Chemnitz (DE); Deep Prakash, Chemnitz (DE)

(73) Assignee: Saralon GmbH, Chemnitz (DE)

(*) Notice: Subject to any disclaimer, the term of this patent is extended or adjusted under 35 U.S.C. 154(b) by 127 days.

(21) Appl. No.: 15/569,735

(22) PCT Filed: Jan. 16, 2017

(86) PCT No.: PCT/EP2017/050754
§ 371 (c)(1),
(2) Date: Oct. 26, 2017

(87) PCT Pub. No.: WO2017/121891
PCT Pub. Date: Jul. 20, 2017

(65) Prior Publication Data
US 2018/0131011 A1 May 10, 2018

(30) Foreign Application Priority Data
Jan. 15, 2016 (GB) .................................. 1600804.7

(51) Int. Cl.
H01M 6/40 (2006.01)
H01M 2/04 (2006.01)
(Continued)

(52) U.S. Cl.
CPC ............ *H01M 6/40* (2013.01); *H01M 2/021* (2013.01); *H01M 2/028* (2013.01);
(Continued)

(58) Field of Classification Search
CPC ........ H01M 6/40; H01M 6/02; H01M 2/0404; H01M 6/188; H01M 6/18; H01M 4/0414; H01M 10/0565
See application file for complete search history.

(56) References Cited

U.S. PATENT DOCUMENTS 6,379,835 B1    4/2002   Kucherovsky et al.
6,994,933 B1 *  2/2006   Bates ................. H01M 2/0207
                                                 429/124
(Continued)

FOREIGN PATENT DOCUMENTS

KR    20080007692    1/2008

*Primary Examiner* — Stewart A Fraser
(74) *Attorney, Agent, or Firm* — 24IP Law Group USA, PLLC; Timothy Dewitt

(57) ABSTRACT

A thin battery is produced on a surface is taught. A first electrode layer and a second electrode layer are provided on the surface. An electrolyte layer is printed on the first electrode layer and the second electrode layer. The electrolyte layer possesses substantial mechanical strength such that further printings on top of the electrolyte layer can be done. A photopolymerizable protection layer is printed on the electrolyte layer and around a perimeter of the electrolyte layer, wherein the photopolymerizable protection layer solidifies on exposure to suitable radiation. The electrolyte layer comprises at least one first functional group and the photopolymerizable protection layer comprise at least one second functional group such that on exposure to the suitable radiation some of the at least one first functional group makes chemical bonds with some of the at least one second functional group.

26 Claims, 3 Drawing Sheets

(51) Int. Cl.
  *H01M 10/0565*   (2010.01)
  *H01M 2/02*      (2006.01)
  *H01M 4/04*      (2006.01)
  *H01M 6/06*      (2006.01)
  *H01M 6/18*      (2006.01)
  *H01M 6/22*      (2006.01)
  *H01M 6/02*      (2006.01)
  *H01M 6/16*      (2006.01)
  *H01M 10/0585*   (2010.01)

(52) U.S. Cl.
  CPC ....... *H01M 2/0404* (2013.01); *H01M 2/0491* (2013.01); *H01M 4/0414* (2013.01); *H01M 4/0419* (2013.01); *H01M 6/02* (2013.01); *H01M 6/06* (2013.01); *H01M 6/164* (2013.01); *H01M 6/18* (2013.01); *H01M 6/188* (2013.01); *H01M 6/22* (2013.01); *H01M 10/0565* (2013.01); *H01M 10/0585* (2013.01); *H01M 2300/0028* (2013.01); *H01M 2300/0065* (2013.01); *H01M 2300/0085* (2013.01); *H01M 2300/0094* (2013.01)

(56) References Cited

U.S. PATENT DOCUMENTS

| | | |
|---|---|---|
| 8,029,927 B2 | 10/2011 | Tucholski |
| 8,574,742 B2 | 11/2013 | Zhang et al. |
| 2006/0234121 A1 | 10/2006 | Kim |
| 2010/0068617 A1 | 3/2010 | Bedjaoui et al. |
| 2011/0097625 A1 | 4/2011 | Bedjaoui |
| 2011/0281167 A1* | 11/2011 | Sabi .............. H01M 2/0212 429/221 |
| 2012/0107666 A1 | 5/2012 | Bailey et al. |
| 2012/0126931 A1 | 5/2012 | Batting et al. |
| 2015/0214567 A1* | 7/2015 | Etzkom .......... H01M 2/0202 429/303 |
| 2016/0064769 A1 | 3/2016 | Goldstein |

* cited by examiner

THIN BATTERY AND MANUFACTURING METHOD THEREFORE

FIELD OF THE INVENTION

The present disclosure relates to a thin battery having a plurality of layers disposed on a surface, in which the layers are produced by printing methods using functional inks.

Background of the Invention

The demand for thin battery is increasing as the demand for smart and intelligent packages are also increasing. As used in this disclosure, the term "thin battery" refers to a battery, which comprises a plurality of layers with a total maximum thickness of 1 mm, excluding the substrate or surface thickness. Printing machines have been known for centuries for printing colour inks and are available all over the world. The same existing printing machines can also be used to print electronic devices e.g. battery, by replacing colour inks with so-called functional inks. The terms "print," "printability," "printing," "printable" and "printed" as used in this disclosure refer to production methods using the functional inks. More specifically, these production methods include, but are not limited to, screen-printing, stencilling, flexography, gravure, off-set and ink-jet printing. These printing methods can be roll-to-roll or sheet-fed or manual. The term "ink" as used in this disclosure refers to a material that is in liquid or semi-solid or paste form. It will be understood that, after printing of an ink on a surface, a drying or curing process may be required to convert the ink into a solid or a gel form. Typically, heat and/or radiation are used for the drying or curing processes. The drying or curing processes can be also self-activated.

The thin batteries, as used in this disclosure refer to primary or secondary batteries. The thin batteries known in the art can be divided mainly into two categories as shown in FIG. 1 and FIG. 2. FIG. 1 shows a cross-sectional view of a typical co-planar structure of a battery unit cell 100, such as is known from U.S. Pat. No. 8,029,927. FIG. 2 shows a cross-sectional view of a typical vertical structure of a battery unit cell 200, such as is known from US 20060234121, U.S. Pat. Nos. 8,574,742 and 6,379,835. In FIG. 1 the battery unit cell 100 comprises a bottom substrate 101, which is generally mechanically flexible. On top of the bottom substrate 101 is provided a first current collecting layer 103 and a second current collecting layer 104. A first electrode layer 107 and a second electrode layer 108 are provided on top of the first current collecting layer 103 and the second current collecting layer 104, respectively. The first current collecting layer 103, the second current collecting layer 104, the first electrode layer 107 and the second electrode layer 108 can be produced by a printing method using functional inks. In order to complete the battery structure, the first electrode layer 107 and the second electrode layer 108 should be connected through an ionically conducting layer 110. The battery 100 is sealed with a top substrate 102, using an adhesive layer 105. The adhesive layer 105 is provide around the battery unit cell 100 such that a portion of the first current collecting layer 103 and a portion of the second current collecting layer 104 are projecting out of the battery unit cell 100.

In the vertical structure as shown in FIG. 2, a first current collecting layer 203 and a second current collecting layer 204 are provided on a top substrate 202 and on a bottom substrate 201, respectively. A first electrode layer 207 and a second electrode layer 208 are provided respectively on top of the first current collecting layer 203 and on top of the second current collecting layer 204. The first electrode layer 207, the second electrode layer 208, the first current collecting layer 203 and the second current collecting layer 204 can be provided by the printing methods by using functional inks. In order to complete the battery structure, the first electrode layer 207 and the second electrode layer 208 should be connected through an ionically conducting layer 210. The battery 200 is sealed by laminating the top substrate 202 against the bottom substrate 201 using an adhesive layer 205. The adhesive layer 205 is provide around the battery unit cell 200 such that a portion of the first current collecting layer 203 and a portion of the second current collecting 204 are outside the battery unit cell 200.

In both the battery structures, as shown in FIG. 1 and FIG. 2, two substrates are needed. These two substrates are laminated to each other to protect the battery layers from the environment. As mentioned in FIG. 1 and FIG. 2, all the layers of the battery can be produced by a single machine i.e. a printing machine. But a separate machine is required to laminate two substrates. In the battery 100, the top substrate 102 works as a protection layer for the battery materials. If the protection layer of the battery is produced by the same printing machine, the production of the battery would become simpler and also very cost-effective.

SUMMARY OF THE INVENTION

The present invention relates to a thin battery. The thin battery comprises a plurality of layers and at least one of the layers can be produced by printing using functional inks. The thin battery comprises a surface. A first electrode layer and a second electrode layer are provided on the surface. An electrolyte layer is printed on the first electrode layer and the second electrode layer. The electrolyte layer possesses substantial mechanical strength such that further printings on top of the electrolyte layer can be done. A photopolymerizable protection layer is printed on the electrolyte layer and around a perimeter of the electrolyte layer, wherein the photopolymerizable protection layer solidifies on exposure to suitable radiation.

In one aspect of the invention, the electrolyte layer comprises at least one first functional group and the photopolymerizable protection layer comprise at least one second functional group such that on exposure to the suitable radiation some of the at least one first functional group make chemical bonds with some of the at least one second functional group. These chemical bonds keep the solidified photopolymerizable protection layer attached to the electrolyte layer and hence attached to the battery.

In a further aspect of the invention, the first electrode layer and the second electrode layer are separated by a gap.

The electrolyte layer can be produced in one step by printing one functional ink or in multiple steps by printing multiple functional inks, one over another.

DETAILED DESCRIPTION OF THE PREFERRED EMBODIMENTS

The invention will now be described in detail. Drawings and examples are provided for better illustration of the invention. It will be understood that the embodiments and aspects of the invention described herein are only examples and do not limit the protector's scope of the claims in any way. The invention is defined by the claims and their equivalents. It will be understood that features of one aspect or embodiment of the invention can be combined with the feature of a different aspect or aspects and/or embodiments of the invention.

Figure 1:
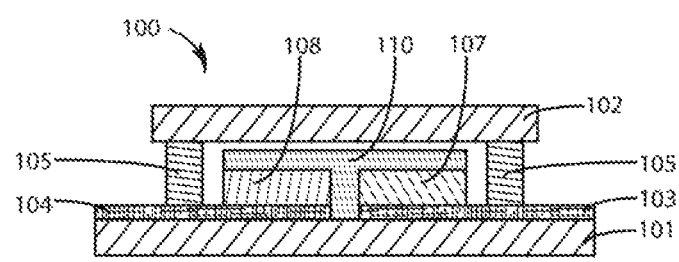
FIG. 1 is a cross-sectional view of a prior art thin battery.
Figure 2:
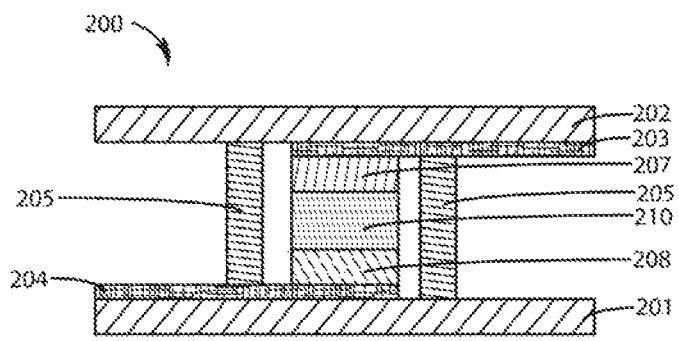
FIG. 2 is a cross-sectional view of another prior art thin battery.
Figure 3:
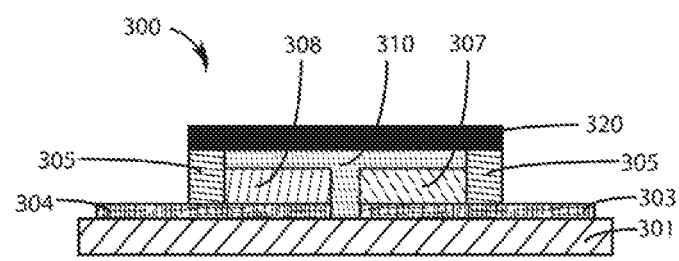
FIG. 3 is a cross-sectional view of a thin battery, in accordance with an aspect of the present invention.

The present invention relates to a thin battery. All layers of the thin battery, including the protection layers, are produced by printing method from functional inks. FIG. 3 illustrates a cross sectional view of a thin battery 300 in accordance with one aspect of the invention. The battery 300 comprises a surface 301. The surface 301 can be mechanically flexible or mechanically rigid. The surface 301 can be electrically conducting or electrically insulating. In one non-limiting example, the surface 301 can be made of polyester materials. In another example, the surface 301 can made of glass. In another example, the surface 301 can made of coated or uncoated paper. In another example, the surface 301 can made of coated metal. In another example, the surface 301 can made of textile. A first current collecting layer 303 and a second current collecting layer 304 are provided on top of the surface 301. The first current collecting layer 303 and the second current collecting layer 304 are separated by a small gap. In one non-limiting aspect, the first current collecting layer 303 and the second current collecting layer 304 are printed from a functional ink, which is conductive. The functional ink can comprise, but is not limited to, carbon or silver particles. In another aspect, the first current collecting layer 303 and the second current collecting layer 304 are produced by etching-out a metalized flexible substrate. For example, a copper metalized polyester foil can be etched into a desired pattern to create the combination of either the first current collecting layer 303 and the surface 301 or the second current collecting layer 304 and the surface 301.

On a portion of the first current collecting layer 303 is provided a first electrode layer 307. The first electrode layer 307 is printed by using a functional ink which comprises substantially, but is not limited to, at least one first electrode active powder, at least one polymeric binder and at least one solvent. On a portion of the second current collecting layer 304 is provided a second electrode layer 308 in such a way that the first electrode layer 307 and the second electrode layer 308 are separated by a gap. The second electrode layer 308 is printed by using a functional ink which comprises substantially, but is not limited to, at least one second electrode active powder, at least one polymeric binder and at least one solvent. The gap that separates the first electrode layer 307 from the second electrode layer 308 is less than 1 mm. The gap can be of any shape e.g. a straight line or a curve.

The first electrode active powder and the second electrode active powder of the thin battery can be selected from an appropriate electrochemical-couple, such as, but not limited to, a zinc-manganese dioxide, lithiummanganese oxide-titanium dioxide, lithium manganese oxide-vanadium oxide, etc. In one non-limiting example, the polymeric binder is water soluble e.g polyethyleneoxide, polyvinylalcohol pyrrolidone etc. In another non-limiting example, the polymeric binder is water insoluble e.g. polystyrene, poly(methyl methacrylate) PMMA, ethyl cellulose, polyvinylidene fluoride etc.

The first electrode layer 307 and the second electrode layer 308 can further comprise electrically conducting particles, which enhance movement of electrons inside the layer. In one non-limiting example, the electrically conducting particles can be graphite, carbon black, carbon nanotube, graphene etc. The first electrode layer 307 and the second electrode layer 308 can further comprise additives to enhance printability of the inks, to improve surface adhesion, to improve dispersion of the particles in the ink, to adjust viscosity, to increase battery voltage, to increase current density and to lower gas evolution. In one non-limiting example, the first electrode layer 307 and the first current collecting layer 303 are made of the same materials. That means a single layer will serve the dual purpose of working as a battery electrode and transferring the generated current to outside of the battery unit cell. In one non-limiting example, the second electrode layer 308 and the second current collecting layer 304 are made of the same materials. That means a single layer will serve the dual purpose, working as a battery electrode and transferring the generated current to outside of the battery unit cell.

An electrolyte layer 310 is printed on a portion of the first electrode layer 307, a portion of the second electrode layer 308 and a portion of the gap. The electrolyte layer 310 is needed to connect the first electrode layer 307 and the second electrode layer 308. In one non-limiting example, the electrolyte layer 310 is provided in one printing step. In a further non-limiting example, the electrolyte layer 310 is a gel electrolyte and provided by a gel electrolyte ink. The use of gel electrolyte is known for battery in prior-arts U.S. Pat. No. 5,925,283 and US20140050990. A typical gel electrolyte ink comprises at least one salt, at least one electrolyte solvent and at least one gel matrix element. After printing the gel electrolyte ink, a curing and/or drying step is required to convert the gel matrix element into a gel matrix. The salt in the electrolyte layer 310 can be selected based on the electrochemistry of the battery. For example, for a zinc-manganese dioxide battery the electrolyte salt can be a zinc chloride and for a lithium manganese oxide-titanium dioxide battery the electrolyte salt can be lithium chloride or lithium nitrate or lithium sulphate or a mixture of different lithium salts. The solvent in the electrolyte layer 310 can be water or a polar organic solvent. The electrolyte solvent is selected in such a way that the at least one salt is soluble in it. In one non-limiting aspect, the gel matrix element comprises a mixture of at least one first monofunctional monomer and at least one first multifunctional monomer. The first monofunctional monomer provides flexibility and the first multifunctional monomer provides mechanical strength to the electrolyte layer 310. In a non-limiting example, the first monofunctional monomer can be monoacrylate, monomethacrylate, monovinyl, monoallyl or a combination thereof. In one non-limiting example, the first monofunctional monomer can be selected from the group of poly(ethylene glycol) methacrylate, poly(ethylene glycol) acrylate, hydroxypropyl methacrylate, N-methylol methacrylamide, methacrylamide, methacrylic acid, acrylic acid and 2-hydroxyethyl acrylate. In a non-limiting example, the first multifunctional monomer can be multiacrylate, multimethacrylate, multivinyl, miltiallyl or a combination thereof. In one non-limiting example, the first multifunctional monomer can be selected from the group of ethylene glycol dimethacrylate, polyethylene glycol dimethacrylate, polyethylene glycol diacrylate, triethylene glycol dimethacrylate, ethylene glycol dimethacrylate and glycerol 1,3-diglycerolate diacrylate.

The gel electrolyte ink further comprises additives to improve printing properties of the ink e.g. to adjust surface tension of the ink, to improve surface adhesion and to adjust viscosity. The gel electrolyte ink further comprises at least one initiator to start the chemical reaction for the formation of the gel matrix. The electrolyte layer 310 comprises at least one first functional group in such a way that after curing and/or drying step of the electrolyte layer 310, some of the at least one first functional group are unreacted and present on the top surface of the electrolyte layer 310. In one non-limiting example, the at least one first functional group is acrylate, methacrylate, vinyl, allyl or a combination thereof. In another non-limiting example, the at least one first functional group is epoxy. In one non-limiting example, the at least one first functional group is the same functional group that is present in the at least one first monofunctional monomer. In another non-limiting example, the at least one first functional group is the same functional group that is present in the at least one first multifunctional monomer. Typically, the gel electrolyte ink layer needs to be cured by UV radiation to form the gel matrix. An incomplete UV curing of the gel electrolyte ink layer causes some of the first functional group to remain unreacted. Some of these unreacted first functional groups can lie on the top surface of the gel matrix that means on the top surface of the electrolyte layer 310.

A boundary layer 305 is provided around a perimeter of the first electrode layer 307 and the second electrode layer 308. The boundary layer 305 defines the battery unit cell area. In one non-limiting example, the boundary layer 305 can be a UV curable ink which is UV cured after printing.

A photopolymerizable protection layer 320 is printed on top of the electrolyte layer 310 and on a portion of the boundary layer 305. The photopolymerizable protection layer 320 is cured by suitable radiation to solidify it. In one non-limiting example, photopolymerizable protection layer 320 is cured by UV radiation. In one non-limiting example, photopolymerizable protection layer 320 is cured by visible light radiation. In one non-limiting example, photopolymerizable protection layer 320 is cured by infrared radiation. In one non-limiting example, photopolymerizable protection layer 320 is cured by electron beam. In one non-limiting example, photopolymerizable protection layer 320 comprises at least one second monofunctional monomer, at least one second multifunctional monomer, at least one multifunctional oligomer and at least one initiator. The photopolymerizable protection layer 320 further comprises additives to enhance printing parameters of the inks e.g. adhesion, viscosity, dispersion, surface tension. The at least one second monofunctional monomer is monoacrylate, monomethacrylate, monovinyl, monoallyl or a combination thereof. The at least one second multifunctional monomer is multiacrylate, multimethacrylate, multivinyl, multiallyl or a combination thereof. In one non-limiting example, the at least one second monofunctional monomer and the at least one second multifunctional monomer are selected from methacrylate VISIOMER® by Evonik. The at least one multifunctional oligomer is epoxy acrylate, aliphatic urethane acrylate, aromatic urethane acrylate, polyester acrylate and acrylic acrylate or a combination thereof. In one non-limiting example, the at least one multifunctional oligomer is Bisphenol A Epoxy Acrylate. The chemical composition of the photopolymerizable protection layer 320 mentioned here is just an example. It does not limit the scope of the invention.

The photopolymerizable protection layer 320 comprises at least one second functional group such that on exposure to the suitable radiation some of the at least one second functional group makes chemical bonds with some of the at least one first functional group of the electrolyte layer 310. In one non-limiting example, the at least one second functional group is acrylate, methacrylate, vinyl, allyl or a combination thereof. In one non-limiting example, the at least one second functional group is epoxy. In one non-limiting example, the at least one second functional group is the same functional group that is present in the at least one second monofunctional monomer. In one non-limiting example, the at least one second functional group is the same functional group that is present in the at least one second multifunctional monomer. In one non-limiting example, the at least one second functional group is the same functional group that is present in the at least one multifunctional oligomer. The chemical bonds between the at least one first functional group of the electrolyte layer 310 and the at least one second functional group of the photopolymerizable protection layer 320 keeps the photopolymerizable protection layer 320 attached to the electrolyte layer 310 and hence attached to the battery.

Figure 4:
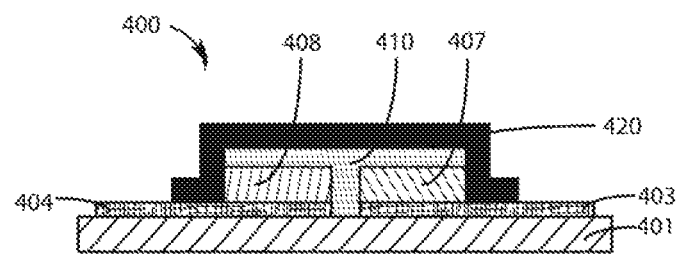
FIG. 4 is a cross-sectional view of a thin battery, in accordance with an aspect of the present invention.

FIG. 4 illustrates a cross sectional view of a thin battery 400 in accordance with another aspect of the invention. The battery 400 includes a surface 401. A first current collecting layer 403 and a second current collecting layer 404 are provided on top of the surface 401. The first current collecting layer 403 and the second current collecting layer 404 are separated by a small gap. On a portion of the first current collecting layer 403 is printed a first electrode layer 407. On a portion of the second current collecting layer 404 is printed a second electrode layer 408 in such a way that the first electrode layer 407 and the second electrode layer are separated by a gap. An electrolyte layer 410 is printed over a portion of the first electrode layer 407, a portion of the second electrode layer 408 and a portion of the gap. The details about the electrolyte layer 410 are already explained above, in FIG. 3. The electrolyte layer 410 comprises at least one first functional group in such a way that after curing and/or drying step of the electrolyte layer 410, some of the at least one first functional group are unreacted and are present on the top surface of the electrolyte layer 410. In one non-limiting example, the at least one first functional group is acrylate, methacrylate, vinyl, allyl or a combination thereof.

A photopolymerizable protection layer 420 is printed on top of the electrolyte layer 410 and around a perimeter of the electrolyte layer 410. The photopolymerizable protection layer 420 is cured by suitable radiation to solidify it. The details about the photopolymerizable protection layer 420 are already explained above, in FIG. 3. The photopolymerizable protection layer 420 comprises at least one second functional group such that on exposure to the suitable radiation some of the at least one second functional group makes chemical bonds with some of the at least one first functional group of the electrolyte layer 410. In one non-limiting example, the at least one second functional group is acrylate, methacrylate, vinyl, allyl or a combination thereof. In another non-limiting example, the at least second functional group is epoxy.

Figure 5:
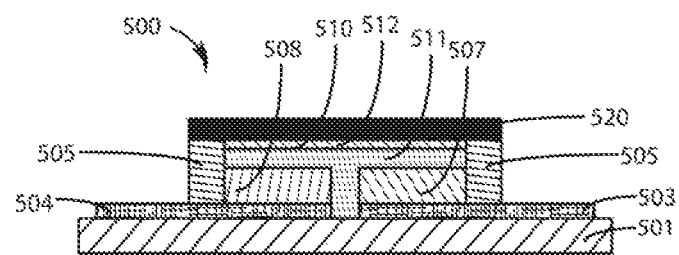
FIG. 5 is a cross-sectional view of a thin battery, in accordance with an aspect of the present invention.

FIG. 5 illustrates a cross sectional view of a thin battery 500 in accordance with another aspect of the invention. The battery 500 includes a surface 501. A first current collecting layer 503 and a second current collecting layer 504 are provided on top of the surface 501. The first current collecting layer 503 and the second current collecting layer 504 are separated by a small gap. On a portion of the first current collecting layer 503, is printed a first electrode layer 507. On a portion of the second current collecting layer 504, is printed a second electrode layer 508 in such a way that the first electrode layer 507 and the second electrode layer 508 are separated by a gap. The electrolyte layer 510 is produced here in two printing steps. First, an ion conducting layer 511 is printed over a portion of the first electrode layer 507, a portion of the second electrode layer 508 and a portion of the gap. A salt solution layer 512 is printed over the ion conducting layer 511, wherein the salt solution layer comprises at least one salt, at least one multifunctional linking agent and the at least one electrolyte solvent.

The ion conducting layer 511 possesses substantial mechanical strength in presence of the electrolyte solvent i.e. the ion conducting layer (511) does not get damaged when the salt solution layer 512 is printed over it. The ion conducting layer 511 comprises at least one electrolyte solvent absorbing powder interconnected through at least one interconnecting material in such a way that the interconnection is not broken in the presence of the electrolyte solvent. The at least one electrolyte solvent absorbing powder does not dissolve in the electrolyte solvent. In one non-limiting example, the at least one electrolyte solvent absorbing powder is cellulose particles or fibers. In another non-limiting example, the at least one electrolyte solvent absorbing powder is silica gel. In another non-limiting example, the at least one electrolyte solvent absorbing powder is surface treated cellulose particles or fibers. In one non-limiting example, the at least one interconnecting material is polyacrylic acid. In one non-limiting example, the electrolyte solvent is water. In one non-limiting example, the electrolyte solvent is polar organic solvent. The electrolyte solvent could also be a mixture of two or more solvents.

The salt in the salt solution layer 512 can be selected based on the electrochemistry of the battery. The salt solution layer 512 further comprises additives to enhance printing parameters of the inks e.g. adhesion, viscosity, dispersion, surface tension. After printing the salt solution layer 512 on top of the ion conducting layer 511, a major portion of the salt and the electrolyte solvent are absorbed into the ion conducting layer 511 and the major portion of the at least one multifunctional linking agent remains on top of the ion conducting layer 511.

The at least one multifunctional linking agent of the salt solution layer 512 comprises the at least one first functional group. In FIG. 3 and FIG. 4 the at least one first functional group lies on the top surface of the electrolyte layer 310 and 410. Here, in FIG. 5, the at least one first functional group (which is a part of the at least one multifunctional linking agent) also lies on the top surface of the electrolyte layer 510 i.e. on the top surface of the ion conducting layer 511.

The multifunctional linking agent is, for example, multiacrylate, multimethacrylate, multivinyl, multiallyl or a combination thereof. The multifunctional linking agent could also be a multiepoxy. In one non-limiting example, the multifunctional linking agent can be selected from the group of ethylene glycol dimethacrylate, polyethylene glycol dimethacrylate, polyethylene glycol diacrylate, triethylene glycol dimethacrylate, ethylene glycol dimethacrylate and glycerol 1,3-diglycerolate diacrylate. In another non-limiting example, the at least multifunctional linking agent can be a molecule with more than two functional groups.

A boundary layer 505 is provided around a perimeter the first electrode layer 507 and the second electrode layer 508. The boundary layer 505 defines the battery unit cell area. In one non-limiting example, the boundary layer 505 can be a UV curable ink which is UV cured after printing.

A photopolymerizable protection layer 520 is printed on top of the salt solution layer 512 and on a portion of the boundary layer 505. The photopolymerizable protection layer 520 is cured by suitable radiation to solidify it. The details about the photopolymerizable protection layer 520 are already explained above, in FIG. 3. The photopolymerizable protection layer 520 comprises at least one second functional group such that on exposure to the suitable radiation some of the at least one second functional group make chemical bonds with some of the at least one first functional group of the at least one multifunctional linking agent present on top of the ion conducting layer 511. In one non-limiting example, the at least one second functional group is acrylate, methacrylate, vinyl, allyl or a combination thereof. In another non-limiting example, the at least second functional group is epoxy. Upon radiation curing, the at least one second functional group present in the photopolymerizable protection layer 520 reacts to each other and solidify. The at least one second functional group in the photopolymerizable protection layer 520 also reacts with the at least one first functional group of the at least one multifunctional linking agent, that is present on top surface of the ion conducting layer 511. This enhances the adhesion of the photopolymerizable layer 520 with the ion conducting layer 511.

Figure 6:
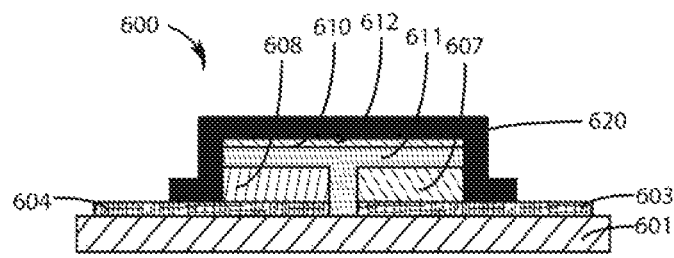
FIG. 6 is a cross-sectional view of a thin battery, in accordance with an aspect of the present invention.

FIG. 6 illustrates a cross sectional view of a thin battery 600 in accordance with one aspect of the invention. The battery 600 includes a surface 601. A first current collecting layer 603 and a second current collecting layer 604 are provided on top of the surface 601. The first current collecting layer 603 and the second current collecting layer 604 are separated by a small gap. On a portion of the first current collecting layer 603 is printed a first electrode layer 607. On a portion of the second current collecting layer 604 is printed a second electrode layer 608 in such a way that the first electrode layer 607 and the second electrode layer are separated by a gap. The electrolyte layer 610 is produced here in two printing steps. First, an ion conducting layer 611 is printed over a portion of the first electrode layer 607, a portion of the second electrode layer 608 and a portion of the gap. A salt solution layer 612 is printed over the ion conducting layer 611, wherein the salt solution layer 612 comprises at least one salt, at least one multifunctional linking agent and at least one electrolyte solvent. The details about the ion conducting layer 611 and the salt solution layer 612 are mentioned above, in FIG. 5.

A photopolymerizable protection layer 620 is printed on top of the salt solution layer 612 and around a perimeter of the ion conducting layer 611. The photopolymerizable protection layer 620 is cured by suitable radiation to solidify it. The details about the photopolymerizable protection layer 620 are already explained above, in FIG. 3. The photopolymerizable protection layer 620 comprises at least one second functional group such that on exposure to the suitable radiation some of the at least one second functional group makes chemical bonds with some of the at least one first functional group of the at least one multifunctional linking agent present on top of the ion conducting layer 611. In one non-limiting example, the at least one second functional group is acrylate, methacrylate, vinyl, allyl or a combination thereof. In another non-limiting example, the at least one second functional group is epoxy. Upon radiation curing, the at least one second functional group present in the photopolymerizable protection layer 620 reacts to each other and solidify. The at least one second functional group in the photopolymerizable protection layer 620 also reacts with the at least one first functional group of the at least one multifunctional linking agent, that is present on top surface of the ion conducting layer 611. This enhances the adhesion of the photopolymerizable protection layer 620 with the ion conducting layer 611.

In order to enhance printability and surface adhesion of printed layers, the respective functional inks further comprise at least one additive. The additive can be selected according to the requirement from, but not limited to, Evonik TEGO Foamex, TEGO Airex, TEGO Flow, TEGO Glide, TEGO Phobe, TEGO Dispers, TEGO ViscoPlus, TEGO Wet, TEGO Twin, TEGO Rad, TEGO Protect etc.

The thin battery 300 can be produced according to the following exemplary process steps:

Step-1: Conductive carbon ink is printed and dried on a surface 301 as a first current collecting layer 303 and as a second current collecting layer 304.

Step-2: A first electrode layer 307 is printed and dried or cured on a portion of the first current collecting layer 303.

Step-3: A second electrode layer 308 is printed and dried or cured on a portion of the second current collecting layer 304.

Step-4: An electrolyte layer 310 is printed on the first electrode layer 307 and the second electrode layer 308, wherein the electrolyte layer 310 comprises at least one first functional group.

Step-5: The electrolyte layer 310 is cured such that some of the at least one first functional group are unreacted and are present on the top surface of the electrolyte layer 310.

Step-6: A boundary layer 305 is printed around a perimeter of the first electrode layer 307 and the second electrode layer 308 and cured. The boundary layer 305 defines the battery unit cell area.

Step-7: A photopolymerizable protection layer 320 is printed on the electrolyte layer 310 and around a perimeter of the electrolyte layer 310, wherein the photopolymerizable protection layer 320 comprises at least one second functional group.

Step-8: The photopolymerizable protection layer 320 is cured by suitable radiation such that the photopolymerizable protection layer 320 solidifies and some of the at least one first functional group make chemical bonds with some of the at least one second functional group.

The thin battery 400 can be produced according to the following exemplary process steps:

Step-1: Conductive carbon ink is printed and dried on a surface 401 as a first current collecting layer 403 and as a second current collecting layer 404.

Step-2: A first electrode layer 407 is printed and dried on a portion of the first current collecting layer 403.

Step-3: A second electrode layer 408 is printed and dried on a portion of the second current collecting layer 404.

Step-4: An electrolyte layer 410 is printed on the first electrode layer 407 and the second electrode layer 408, wherein the electrolyte layer 410 comprises at least one first functional group.

Step-5: The electrolyte layer 410 is cured such that some of the at least one first functional group are unreacted and are present on the top surface of the electrolyte layer 410.

Step-7: A photopolymerizable protection layer 420 is printed on the electrolyte layer 410 and around a perimeter of the electrolyte layer 410, wherein the photopolymerizable protection layer 420 comprises at least one second functional group.

Step-8: The photopolymerizable protection layer 420 is cured by suitable radiation such that the photopolymerizable protection layer 420 solidifies and some of the at least one first functional group make chemical bonds with some of the at least one second functional group.

The thin battery 500 can be produced according to the following exemplary process steps:

Step-1: Conductive carbon ink is printed and dried on a surface 501 as a first current collecting layer 503 and as a second current collecting layer 504.

Step-2: A first electrode layer 507 is printed and dried on a portion of the first current collecting layer 503.

Step-3: A second electrode layer 508 is printed and dried on a portion of the second current collecting layer 504.

Step-4: An ion conducting layer 511 is printed on the first electrode layer 507 and on the second electrode layer 508;

Step-5: The ion conducting layer 511 is cured to solidify;

Step-8: A boundary layer 505 is printed around a perimeter the first electrode layer 507 and the second electrode layer 508 and cured. The boundary layer 505 defines the battery unit cell area.

Step-6: A salt solution layer 512 is printed on the ion conducting layer 511, wherein the salt solution layer 512 comprises at least one salt, at least one multifunctional linking agent and at least one electrolyte solvent; and Step-7: Waiting for few seconds such that a major portion of the salt and the at least one electrolyte solvent are absorbed into the ion conducting layer 511 and a major portion of the at least one multifunctional linking agent remains on top of the ion conducting layer 511.

Step-9: A photopolymerizable protection layer 520 is printed on the salt solution layer 512 and around a perimeter of the ion conduction layer 511, wherein the photopolymerizable protection layer 520 comprises at least one second functional group.

The invention claimed is:

1. A thin battery, comprising:
   a surface;
   a first electrode layer provided on the surface;
   a second electrode layer provided on the surface;
   an electrolyte layer printed on the first electrode layer and the second electrode layer, wherein the electrolyte layer possesses substantial mechanical strength such that further printings on top of the electrolyte layer can be done, and wherein the electrolyte layer comprises at least one first functional group; and
   a photopolymerizable protection layer printed on the electrolyte layer and around a perimeter of the electrolyte layer, wherein the photopolymerizable protection layer solidifies on exposure to suitable radiation, and the photopolymerizable protection layer comprises at least one second functional group, and
   wherein the thin battery further comprises chemical bonds formed by some of the at least one first functional group with some of the at least one second functional group.

2. The thin battery according to claim 1, wherein the chemical bonds form on exposure of the at least one first functional group and the at least one second functional group to the suitable radiation.

3. The thin battery according to claim 1, wherein the at least one first functional group is acrylate, methacrylate, vinyl, allyl or a combination thereof.

4. The thin battery according to claim 1, wherein the at least one second functional group is acrylate, methacrylate, vinyl, allyl or a combination thereof.

5. The thin battery according to claim 1, wherein the at least one first functional group is epoxy.

6. The thin battery according to claim 1, wherein the at least one second functional group is epoxy.

7. The thin battery according to claim 1, wherein the first electrode layer and the second electrode layer are separated by a gap of less than 1 mm.

8. The thin battery according to claim 7, wherein the electrolyte layer is printed on the first electrode layer, the second electrode layer and the gap.

9. The thin battery according to claim 1, wherein the electrolyte layer is a gel electrolyte.

10. The thin battery according to claim 1, wherein the electrolyte layer is produced by providing at least two separate layers:
   an ion conducting layer printed on the first electrode layer and the second electrode layer, wherein the ion conducting layer possesses substantial mechanical strength in presence of an electrolyte solvent; and
   a salt solution layer provided on the ion conducting layer, wherein the salt solution layer comprises at least one salt, at least one multifunctional linking agent and the electrolyte solvent.

11. The thin battery according to claim 10, wherein the electrolyte solvent is water.

12. The thin battery according to claim 10, wherein the electrolyte solvent is a polar organic solvent.

13. The thin battery according to claim 10, wherein the electrolyte solvent is a mixture of two or more solvents.

14. The thin battery according to claim 10, wherein the ion conducting layer comprises at least one water absorbing powder interconnected through at least one interconnecting material in such a way that the interconnection is not broken in the presence of water.

15. The thin battery according to claim 14, wherein the interconnecting material of the ion conducting layer is polyacrylic acid.

16. The thin battery according to claim 10, wherein the multifunctional linking agent of the salt solution layer is multiacrylate, multimethacrylate, multivinyl, multiallyl or a combination thereof.

17. The thin battery according to claim 10, wherein the multifunctional linking agent of the salt solution layer is multiepoxy.

18. The thin battery according to claim 1, further comprising a first current collecting layer provided between the first electrode layer and the surface.

19. The thin battery according to claim 1, further comprising a second current collecting layer provided between the second electrode layer and the surface.

20. The thin battery according to claim 1, wherein the suitable radiation is visible light.

21. The thin battery according to claim 1, wherein the suitable radiation is infrared.

22. The thin battery according to claim 1, wherein the suitable radiation is ultraviolet.

23. The thin battery according to claim 1, wherein the suitable radiation is electron beam.

24. A method of producing a thin battery, comprising the steps of:
   a. printing a first electrode on a surface;
   b. printing a second electrode on the surface;
   c. printing an electrolyte layer on the first electrode layer and the second electrode layer, wherein the electrolyte layer comprises at least one first functional group;
   d. curing the electrolyte layer such that some of the at least one first functional group are unreacted and are present on the top surface of the electrolyte layer;
   e. printing a photopolymerizable protection layer on the electrolyte layer and around a perimeter of the electrolyte layer, wherein the photopolymerizable protection layer comprises at least one second functional group; and
   f. curing the photopolymerizable protection layer by suitable radiation such that the photopolymerizable protection layer solidifies and some of the at least one first functional group make chemical bonds with some of the at least one second functional group.

25. The method according to claim 24, further comprising the steps of drying or curing of at least one of the first electrode layer and the second electrode layer.

26. The method according to claim 24, wherein the electrolyte layer is produced by the steps of:
   a. printing an ion conducting layer on the first electrode layer and on the second electrode layer;
   b. curing the ion conducting layer to solidify the ion conducting layer;
   c. printing a salt solution layer on the ion conducting layer, wherein the salt solution layer comprises at least one salt, at least one multifunctional linking agent and the electrolyte solvent; and
   d. waiting for a major portion of the salt and the electrolyte solvent to be absorbed into the ion conducting layer, such that a major portion of the at least one multifunctional linking agent remains on top of the ion conducting layer.

* * * * *